United States Patent
Hale et al.

(10) Patent No.: US 11,108,758 B2
(45) Date of Patent: Aug. 31, 2021

(54) REACTIVE PROGRAMMING SUBSCRIPTION CONTEXT

(71) Applicant: Pivotal Software, Inc., San Francisco, CA (US)

(72) Inventors: Joseph Benjamin Hale, Corte Madera, CA (US); Stéphane Adrien Joseph Maldini, San Francisco, CA (US); Simon Baslé, Nantes (FR)

(73) Assignee: Pivotal Software, Inc., San Francisco, CA (US)

( * ) Notice: Subject to any disclaimer, the term of this patent is extended or adjusted under 35 U.S.C. 154(b) by 114 days.

(21) Appl. No.: 16/377,017

(22) Filed: Apr. 5, 2019

(65) Prior Publication Data

US 2019/0379650 A1  Dec. 12, 2019

Related U.S. Application Data (60) Provisional application No. 62/682,629, filed on Jun. 8, 2018.

(51) Int. Cl.
*H04L 29/06* (2006.01)
*H04L 29/08* (2006.01)

(52) U.S. Cl.
CPC .......... *H04L 63/08* (2013.01); *H04L 67/2809* (2013.01)

(58) Field of Classification Search
CPC ..... G06F 21/10; H04L 63/08; H04L 67/2009; H04L 67/1097
See application file for complete search history.

(56) References Cited

U.S. PATENT DOCUMENTS

| | | | |
|---|---|---|---|
| 5,819,255 A | 10/1998 | Celis et al. |
| 6,606,626 B1 | 8/2003 | Ponnekanti |
| 7,139,749 B2 | 11/2006 | Bossman et al. |
| 9,400,638 B2 | 7/2016 | Smet et al. |
| 2012/0047495 A1 | 2/2012 | Meijer et al. |
| 2012/0084749 A1 | 4/2012 | Gogh |

(Continued)

OTHER PUBLICATIONS

Docs.spring.io [online] "23. Web Reactive Framework: Part V. The Web," retrieved on Mar. 26, 2019, retrieved from: URL <https://docs.spring.io/spring-framework/does/5.0.0.M1/spring-framework-reference/html/web-reactive.html>, 5 pages.

(Continued)

*Primary Examiner* — Dao Q Ho
(74) *Attorney, Agent, or Firm* — Fish & Richardson P.C.

(57) ABSTRACT

Methods, systems, and apparatus, including computer programs encoded on computer storage media, for implementing subscription contexts in a reactive programming system. One of the methods includes receiving, by a reactive programming system comprising one or more computers, a reactive programming program defining an ordering of a plurality of operators, the plurality of operators including a subscriber context operator that writes a value to a subscription context for a particular subscriber, wherein the ordering defines an upstream subscription flow ordering from the particular subscriber to a publisher and a downstream data flow ordering from the publisher to the particular subscriber. The operators are evaluated in the upstream subscription flow ordering, including updating a subscription context of each operator with the value written by the subscriber context operator.

17 Claims, 4 Drawing Sheets

(56) References Cited

U.S. PATENT DOCUMENTS

| | | | |
|---|---|---|---|
| 2013/0117736 A1* | 5/2013 | De Smet | G06F 40/18 |
| | | | 717/153 |
| 2014/0025630 A1* | 1/2014 | Takase | H04L 67/1097 |
| | | | 707/609 |

OTHER PUBLICATIONS

Github.com [online] "High performance reactive Postgres Client written in Java," year 2019, [retrieved on Mar. 26, 2019], retrieved from: URL <https://github.com/reactiverse/reactive-pg-client>, 7 pages.

Jdbi.org [online] Jdbi 3 Developer Guide, dated Jan. 22, 2019 [retrieved on Mar. 26, 2019], retrieved from: URL <http://jdbi.org/>, 126 pages.

Maldini, "Reactor Netty," Asynchronous TCP, UDP and HTTP, dated Mar. 26, 2019, 9 pages.

Postgresql.org [online] Chapter 51. Frontend/Backend Protocol, dated Feb. 14, 2019 [retrieved on Mar. 26 2019], retrieved from: URL <https://www.postgresql.org/docs/9.6/protocol.html>2 pages.

Projectreactor.io [online] Reactor Core 3.2.8.Release, retrieved on Mar. 26, 2019, retrieved from: URL <https://projectreactor.io/docs/core/release/api/>, 2 pages.

R2dbc.io [online] R2DBC: Clients, year 2018, [retrieved on Mar. 26, 2019], retrieved from: URL <https://r2dbc.io/clients/>, 4 pages.

\* cited by examiner

REACTIVE PROGRAMMING SUBSCRIPTION CONTEXT

CROSS-REFERENCE TO RELATED APPLICATION

This application claims priority to U.S. Provisional Application No. 62/682,629, filed on Jun. 8, 2018. The disclosure of the prior application is considered part of and is incorporated by reference in the disclosure of this application.

BACKGROUND

This specification relates to reactive programming.

Reactive programming is an asynchronous programming paradigm that is focused on data streams and the propagation of change. Therefore, in a reactive programming language it is possible to express static, e.g., arrays, or dynamic, e.g., event emitters, data streams by simply declaring variables having appropriate types.

In this specification, a consumer of a data stream in a reactive programming language program will be referred to as a subscriber, and a producer of data in the data stream will be referred to as a publisher. No data begins to flow, however, until a subscriber subscribes to a publisher. After subscriber subscribes to a publisher, the publisher can then push values to the subscriber as soon as they become available. A reactive programing system thus gives developers the ability to define operators between the publisher and the subscriber that define how the data is transformed.

A primary advantage of reactive programming paradigms is that the code is asynchronous and non-blocking. This means that a single thread can be used to process multiple asynchronous sequences that execute at roughly the same time, meaning that execution often jumps from one thread to another. In other words, rather than blocking on a particular operation, the execution is allowed to switch to another active task using the same underlying resources and later come back to the previous process when the asynchronous processing has completed.

This is an important feature for modern online applications that can have hundreds or thousands of concurrent users. For example, in a web server use case, in a traditional programming model in which thousands of users were seeking access to the same backend resources, each thread serving a connection would block while the backend resources were retrieved. Therefore, serving ten thousand concurrent users would require ten thousand threads, which is not a plausible number of threads on most systems.

Instead, with a reactive programming system, the threads do not block, and the same thread resources can be continually reassigned while waiting for retrieval of the backend resources. Therefore, by using a reactive programming system, a few hundred threads may be sufficient to serve active connections to 100,000 concurrent users.

However, the nonblocking aspects of a reactive programming system introduces additional complexities. In particular, thread boundaries are no longer obeyed. In a blocking programming paradigm, each thread can store its own copy of a local variable. For example, in Java, threads can make use of ThreadLocal variables to store local copies of data.

In contrast, in a reactive programming system, the thread is not owned by the program currently being executed, and thus the thread can be switched to execute operators of other program instances at any time. This means that thread boundaries no longer provide stability for storing information locally in association with a single thread.

An example where this can present a problem is in security use case in which access to certain system resources is restricted by the identity of the user. In a traditional blocking paradigm, a thread can authenticate the user and then store the user's credentials in a thread local variable, which can be used by later calls in the program to verify the identity of the user.

However, in a reactive programming system, the user's identity cannot be stored locally in association with a thread because thread boundaries are no longer obeyed. One workaround for this problem is to modify the variable types so that contextual data is passed through the data flow. But this approach makes the code cumbersome and leaks contextual data into the method signatures.

SUMMARY

This specification describes how a reactive programming computer system can use subscription contexts to store data values that are stable even in a nonblocking computing environment. The values written to the subscription context remain associated with a particular subscriber regardless of which threads execute the operators of the program.

In general, one innovative aspect of the subject matter described in this specification can be embodied in methods that include the actions of receiving, by a reactive programming system comprising one or more computers, a reactive programming program defining an ordering of a plurality of operators, the plurality of operators including a subscriber context operator that writes a value to a subscription context for a particular subscriber, wherein the ordering defines an upstream subscription flow ordering from the particular subscriber to a publisher and a downstream data flow ordering from the publisher to the particular subscriber; evaluating, by the reactive programming system, the operators in the upstream subscription flow ordering, including updating a subscription context of each operator with the value written by the subscriber context operator; and upon receiving an input data item, processing, by the reactive programming system, the input data item using the operators in the downstream data flow ordering to generate a final output data item for the input data item, wherein one or more operators that are executed in the downstream data flow ordering access the value of the subscription context written by the subscriber context operator during evaluation of the operations in the upstream subscription flow ordering. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. The subscriber context operator occurs in the program after one or more other operators but is executed before any of the other operators. Evaluating the operators in the upstream subscription flow ordering propagates the subscription context from the particular subscriber to the publisher. One or more of the operators are executed by different threads of the reactive programming system. The plurality of operators include a second subscriber context operator that is upstream from the subscriber context operator, and wherein updating the subscription context for the second subscriber context operator comprises merging a second value written by the second subscriber context with the value written by the subscriber context operator. The value written by the subscriber context operator is only available to operators that are upstream from the subscriber context operator. Accessing, by a particular operator, the value of the subscription context comprises requesting the value of the subscription context from another operator downstream from the particular operator. The subscription context is immutable while processing the input data item using the operators in the downstream data flow. A second subscriber context operator that is upstream from the subscriber context operator writes a second value that masks the value written by the subscriber context operator by making a copy of the subscription context having the second value. A nested value, written by a nested subscriber context operator that is nested inside a first operator of the plurality of operators, is not visible to any upstream operators of the first operator.

Particular embodiments of the subject matter described in this specification can be implemented so as to realize one or more of the following advantages. Using subscription contexts allows programs to store data in nonblocking computing environments where thread boundaries are not correlated to specific units of work, e.g., processing an incoming HTTP request. This allows the speed and efficiency advantages of reactive programming to be extended to many other use cases in which reactive programming was previously not available. For example, subscription contexts can be used to manage open database transactions, which makes interacting with the database faster, more efficient, and more scalable, particularly when the database is being used by many concurrent users. As another example, reactive programming can be used to store user credentials for authenticating users. The subscriber context also enables libraries and frameworks to associate metadata to reactive sequences without these leaking into the API or the end user's code, which improves the readability of the code and the efficiency of maintaining the code.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a reactive programming system can implement subscription contexts, which provide the ability for stable local data to be stored for a particular subscriber. In other words, the subscription context allows the data to remain locally associated with a subscriber rather than a thread.

Subscription contexts solve the problem of storing data in an computing environment that does not obey thread boundaries nor strongly correlate each thread to a particular unit of work. This increases the flexibility and computing capabilities of a reactive programming system.

In this specification, a subscription context is a data structure that stores one or more data values in association with a particular subscriber and a particular operator of a reactive programming language program. In some implementations, a subscription context is implemented as a mapping between keys and values, e.g., as a dictionary, a hash map, or an associative array, to name just a few examples.

In a reactive programming system, each program defines an ordering of one or more operators, which the system can iterate over twice in opposite directions. An upstream ordering of the operators from a subscriber to a publisher represents a subscription flow through the operators for a particular subscriber. A downstream ordering of operators represents a data flow through the operators that propagates data from a particular publisher to a particular subscriber.

A reactive programming system generally executes the upstream subscription flow first, followed by the downstream data flow. Subscription contexts can be written during the upstream subscription flow. During the downstream data flow, each downstream operator can request the current values of the subscription context from a downstream operator.

This means that the values written to the subscription context are only available for upstream operators. In addition, in some implementations, the subscription contexts cannot be mutated during the downstream data flow.

Figure 1A:
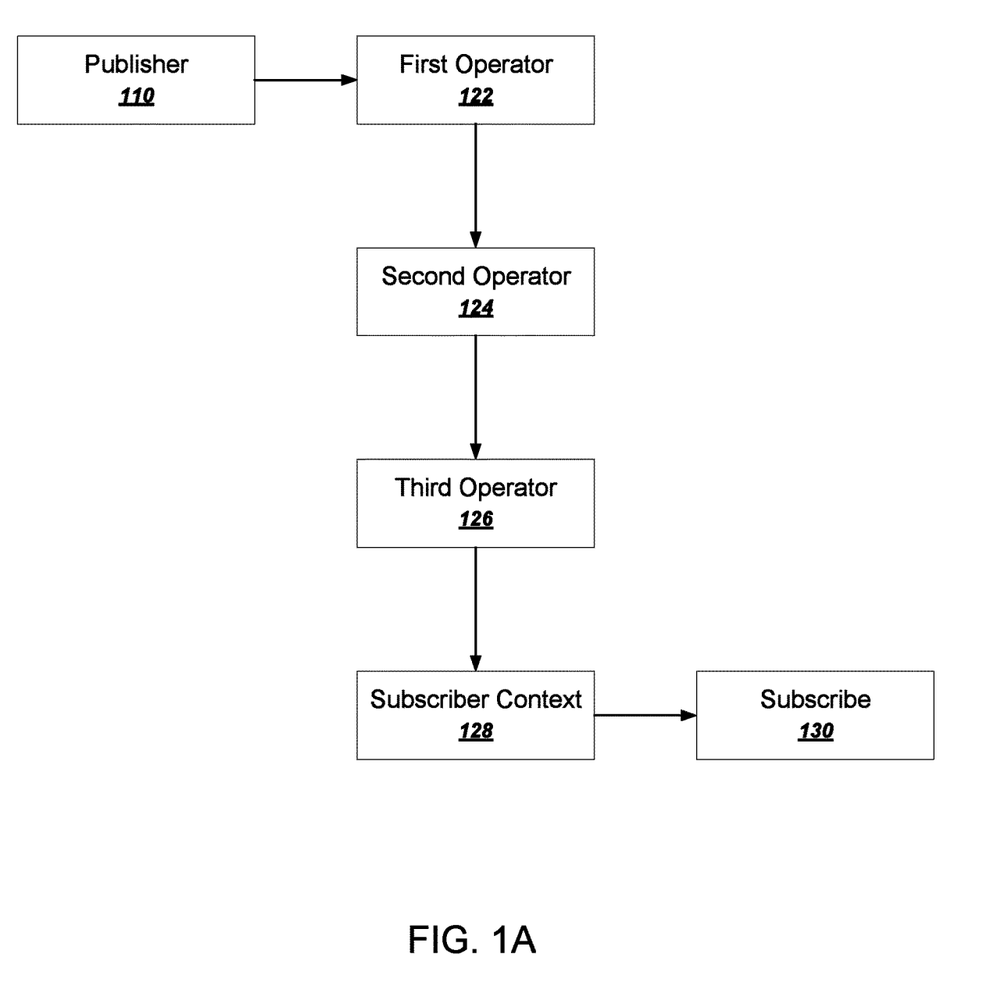
FIG. 1A is a diagram that illustrates operators defined by a reactive programming program.

FIG. 1A is a diagram that illustrates operators defined by a reactive programming program. Each operator illustrated in FIG. 1A can correspond to a respective statement in the program, and the ordering shown in FIG. 1A can be defined by the ordering of the statements in the program. Alternatively or in addition, each of the operators can represent respective computing resources that execute computer program instructions to implement one or more corresponding statements of the reactive program.

The publisher operator 110 emits data whenever it becomes available. As described above, the publisher operator 110 only begins to emit data after receiving a subscription request from a subscriber.

The operators 122, 124, and 126 define respective and sequential transformations of the data. The operators 122, 124, and 126 can be any appropriate operators. As one example, the first operator 122 can be a map that transforms each input data item received from the publisher into a corresponding mapped data item; the second operator 124 can be a filter operator that passes along fewer than all data items received from the first operator 122 according to one or more filter criteria; and the third operator 126 can be a buffer operator that concatenates data items before passing along the concatenated data items to the subscriber.

The subscriber context operator 128 writes a value to the subscriber context for a particular subscriber. As mentioned above, the value in the subscriber context is only available for upstream operators.

The subscribe operator 130 defines a subscriber for the publisher 110. The subscribe operator 130 kicks off the entire upstream subscription process and defines a receiving operator for the downstream data flow process.

Figure 1B:
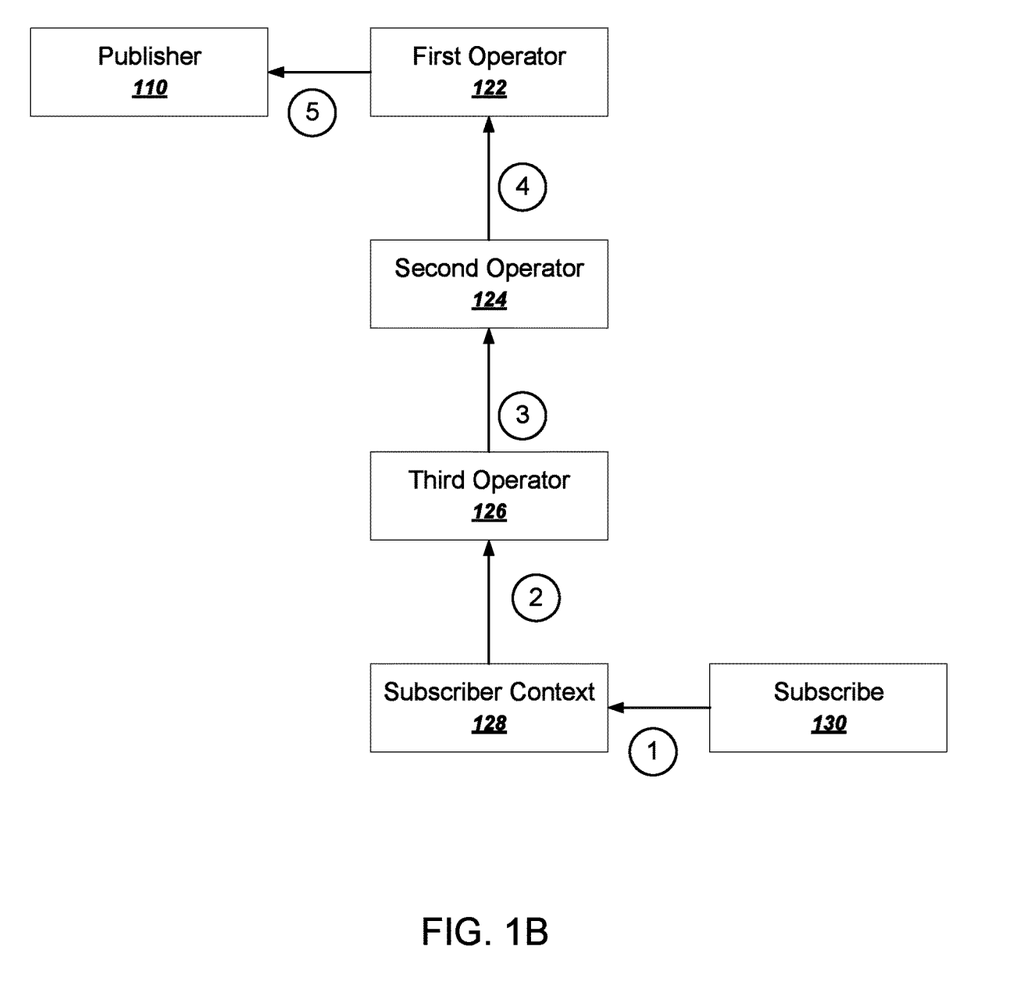
FIG. 1B illustrates the upstream subscription flow.

FIG. 1B illustrates the upstream subscription flow. The system first executes the subscribe operator 130 that appears as the last operator in the program. In this example, the last operator in the program is the subscriber context operator 130.

The system then follows the upstream ordering to perform a subscription operation for each operator in the upstream subscription flow. Thus, the system performs the following subscription operations in the upstream ordering. First, the system performs the subscriber context operator 128 that writes to the subscription context and subscribes the subscriber context operator to the third operator 126. Subsequent propagation of subscription operations upstream makes the subscription context available to all upstream operators.

The system then performs the following operations in the upstream subscription flow: a subscription operation for the third operator 126 so that the third operator 126 is subscribed to the second operator 124; a subscription operation for the second operator 124 so that the second operator 124 is subscribed to the first operator 122; and a subscription operation for the first operator 122 so that the first operator 122 is subscribed to the publisher 110.

Figure 1C:
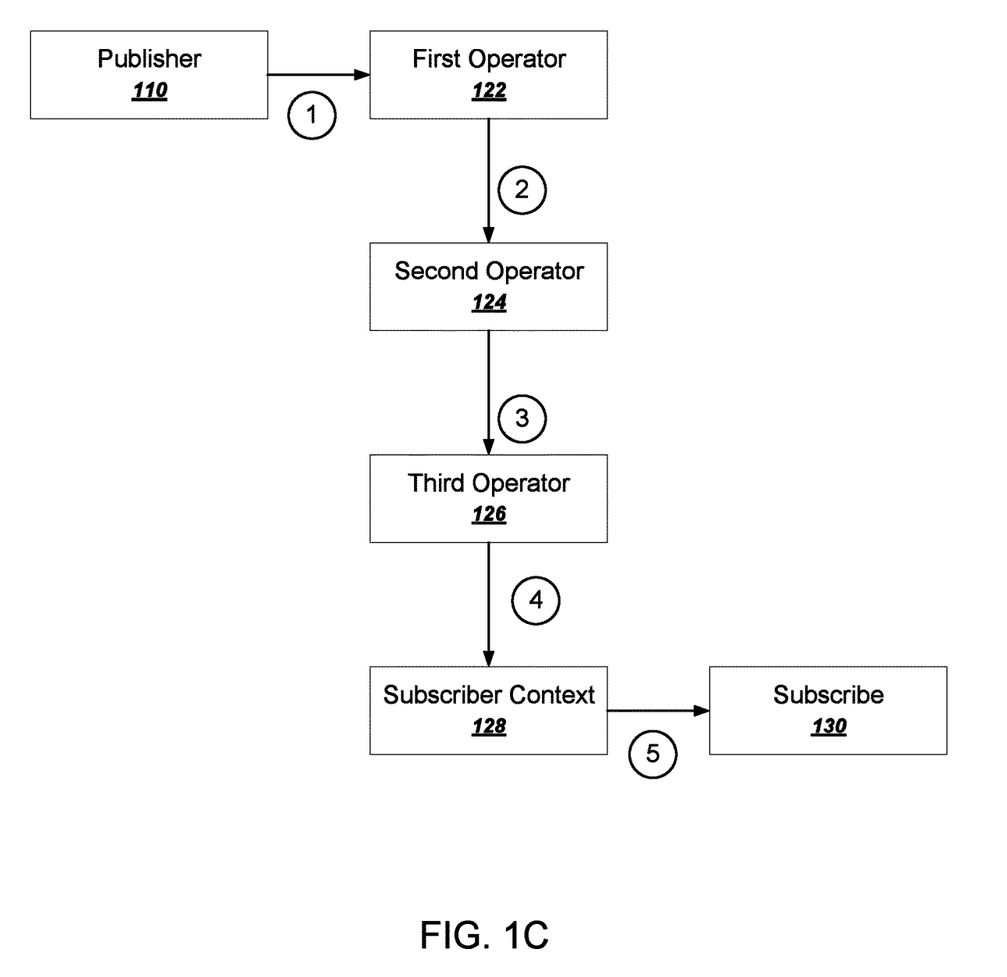
FIG. 1C illustrates the downstream data flow.

FIG. 1C illustrates the downstream data flow. The system first executes the publisher operator 110, which begins to emit one or more data items. The system then executes the first operator 122, followed by the second operator 124, followed by the third operator 126, followed by the subscriber context operator. As described above, because reactive programming is nonblocking, different threads of the underlying computing system can execute different respective operators. Another feature of reactive programming systems is that they facilitate handling backpressure caused by publishers emitting more data than subscribers can consume. In particular, the upstream subscription connections allow a subscriber to notify a publisher to reduce or otherwise dictate the data rate of the publisher, rather than simply filling an ever-expanding buffer of data emitted by the publisher.

Because the operators 122, 124, and 126 are all upstream of the subscriber context operator 128, all the operators could access the value stored in the subscription context regardless of which threads executed the subscriber context operator 128 and which threads executed the operators 122, 124, and 126. Finally, the system provides the processed data items to the subscriber defined by the subscribe operator 130.

Figure 2:
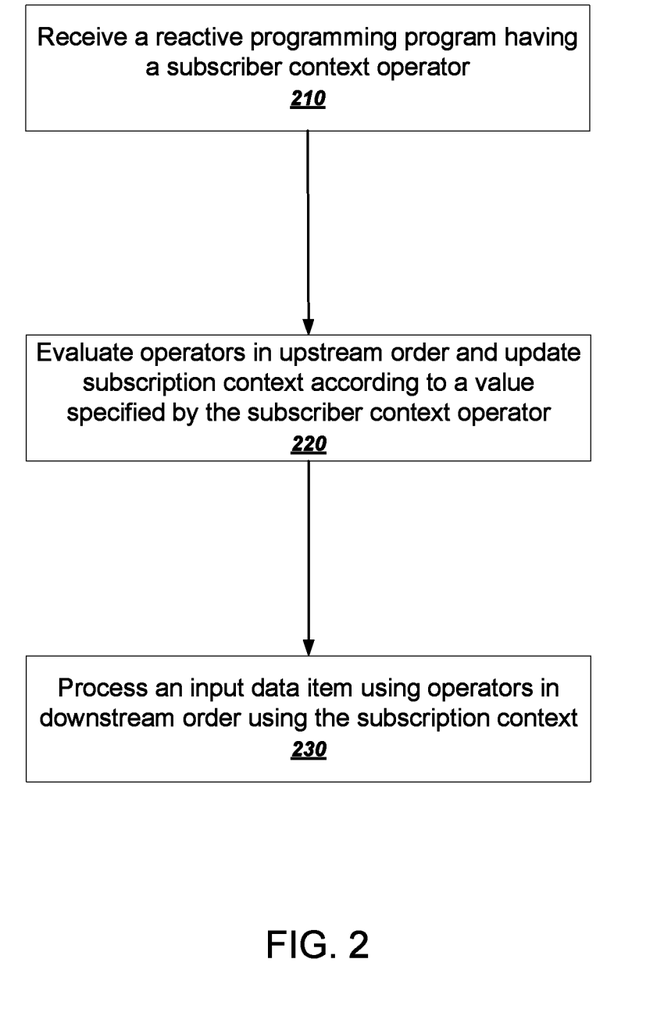
FIG. 2 is a flowchart of an example process for executing a reactive programming program having a subscriber context operator that writes to a subscription context.

FIG. 2 is a flowchart of an example process for executing a reactive programming program having a subscriber context operator that writes to a subscription context. Evaluating the program will have the effect of propagating a subscription context to operators in the upstream direction, which can then be used by the operators processing input data items in the downstream direction. The process can be performed by any appropriate computing system that supports execution of reactive programming programs. The process will be described as being performed by a system of one or more computers, located in one or more locations, and programmed appropriately in accordance with this specification.

The system receives a reactive programming program having a subscriber context operator (210). As explained above, each statement in the program corresponds to a particular operator to be implemented by the system.

A subscriber context statement in the program can be evaluated to implement a subscriber context operator, which writes a value to the subscription context for a particular subscriber. Because subscription contexts are propagated upstream to producers, the subscription context operators often appear near the end of the program. This is advantageous because library developers can use this arrangement to provide users with a natural upstream interface using the subscription context.

Subscriber context operators that are further upstream essentially mask the values written by subscriber context operators that are further downstream. Therefore, the order in which the subscriber context operators appears dictates that value that is accessible by each operator.

If upstream subscriber context operators do not have conflicting writes, the subscriber context operator can update the subscription context by merging its value with values received from downstream subscription context operators.

The system evaluates operators in upstream order and updates the subscription context according to a value specified by the subscriber context operator (220). The system starts execution with the statement that occurs last in the program and then evaluates operators in the upstream order. When the system evaluates the subscription context statement, the system writes a value specified in the statement to the subscription context. Because subscription contexts are propagated upstream, the value written by a particular subscription context operator is generally directly accessible only to upstream operators.

In order to make the subscription context safe for multithreading environments, the system can implement every write to the subscription context as a copy-on-write. In other words, whenever an operator writes to the subscription context, a new copy is created and the new copy is propagated upstream rather than the previous copy of the subscription context. Implementing the writes as a copy-on-write can eliminate race conditions due to multiple threads attempting to interact with and potentially modify the same subscription context.

The system processes an input data item according to operators in the downstream order using the subscription context (230). As described above, the system can transform data items through the plurality of operators in the downstream order. Each of the operators may be executed by a different thread due to the nonblocking nature of reactive programming systems. But because each operator has been associated with a subscription context during the upstream iteration, each operator still has data that is local to the particular subscriber.

While processing the operators during the downstream data flow, the subscription context is generally immutable. In other words, operators can read the subscription context if they were upstream from the subscription context operator, but operators cannot alter the subscription context during the downstream data flow.

A variety of examples and use cases will now be described for using subscription contexts. For clarity and ease of understanding, the source code of the examples below is written at the level of an application intended to be used in an reactive programming application framework that automatically provides some of the low level functionality, including the subscribe operator that actually initiates the upstream subscription flow. Therefore, some functionality of the reactive programming systems described in this specification are not represented by the statements in the source code examples below.

TABLE 1 illustrates an example of using a subscriber context operator ".subscriberContext."

TABLE 1

| | |
|---|---|
| 1 | String key = "message"; |
| 2 | Mono<String> r = Mono.just("Hello") |
| 3 | .flatMap( s -> Mono.subscriberContext( ) |
| 4 | .map( ctx -> s + " " + ctx.get(key))) |
| 5 | .subscriberContext(ctx -> ctx.put(key, "World")); |

During the upstream subscription flow, the system evaluates the operators in the upstream order. Therefore, the subscriber context operator on line 5 is executed first. This operator writes to the subscription context using the key "message" and the value "World."

The subscription context is then propagated upstream, and will therefore be accessible by the upstream flatMap operator.

During the downstream data flow, the flatMap operator materializes the subscription context on line 3, and then accesses the value for the key "message" on line 4. The flatMap operator outputs a single data item according to a string of chained-together method invocations. In some other reactive programming language implementations, the language can include an operator that materializes the subscription context outside of the context of other operators.

The result is concatenating the initial value for "Hello" with the value in the subscription context, "World."

TABLE 2 illustrates how subscription contexts are only available to upstream operators.

TABLE 2

| | |
|---|---|
| 1 | String key = "message"; |
| 2 | Mono<String> r = Mono.just("Hello") |
| 3 | .subscriberContext(ctx -> ctx.put(key, "World")) |
| 4 | .flatMap( s -> Mono.subscriberContext( ) |
| 5 | .map( ctx -> s + " " + |
| 6 | ctx.getOrDefault(key, "Stranger"))); |

In this example, the subscriber context operator on line 3 is upstream from the flatMap operator on line 4. Therefore, when the flatMap operator attempts to access the subscription context, nothing is there. This occurs because the subscription contexts are propagated upstream, and are therefore only visible to upstream operators.

The result of this example is that the getOrDefault function will return "Stranger" rather than the value written to the subscription context, and the result is "Hello Stranger."

TABLE 3 illustrates how subscription contexts are immutable in the downstream data flow.

TABLE 3

| | |
|---|---|
| 1 | String key = "message"; |
| 2 | Mono<String> r = Mono.subscriberContext( ) |
| 3 | .map( ctx -> ctx.put(key, "Hello")) |
| 4 | .flatMap( ctx -> Mono.subscriberContext( )) |
| 5 | .map( ctx -> ctx.getOrDefault(key,"Default")); |
| 6 | |

In this example, the subscription context is materialized on line 2. On line 3, the map operator attempts to write to the subscription context.

However, because subscription contexts are immutable during the downstream data flow, the map operator on line 3 has no effect. In addition, since no subscriber context operator was executed during the upstream subscription flow, no value is set for the subscription context, and the flatMap operator on line 4 receives only a default value.

TABLE 4 illustrates how subscription contexts can be written according to the upstream ordering of operators.

TABLE 4

| | |
|---|---|
| 1 | String key = "message"; |
| 2 | Mono<String> r = Mono.just("Hello") |
| 3 | .flatMap( s -> Mono.subscriberContext( ) |
| 4 | .map( ctx -> s + " " + ctx.get(key))) |

TABLE 4-continued

| | |
|---|---|
| 5 | .subscriberContext(ctx -> ctx.put(key, "Reactor")) |
| 6 | .subscriberContext(ctx -> ctx.put(key, "World")); |

In this example, the subscriber context operator on line 6 is executed first during the upstream subscription flow. This alters the subscription context to have the value "World" for the key "message."

A second subscriber context operator on line 5 is executed next during the upstream subscription flow. This successfully modifies the subscription context to have the value "Reactor" for the key "message."

Therefore, the upstream flatMap operator has access to the subscription context of its immediate downstream operator. Thus, the flatMap operator will receive the value "Reactor" for the subscription context, rather than the value "World." The result therefore is "Hello Reactor" rather than "Hello World."

TABLE 5 illustrates how operators request the subscription contexts from their downstream operators.

TABLE 5

| | |
|---|---|
| 1 | String key = "message"; |
| 2 | Mono<String> r = Mono.just("Hello") |
| 3 | .flatMap( s -> Mono.subscriberContext( ) |
| 4 | .map( ctx -> s + " " + ctx.get(key))) |
| 5 | .subscriberContext(ctx -> ctx.put(key, "Reactor")) |
| 6 | .flatMap( s -> Mono.subscriberContext( ) |
| 7 | .map( ctx -> s + " " + ctx.get(key))) |
| 8 | .subscriberContext(ctx -> ctx.put(key, "World")); |

In this example, there are two subscriber context operators on lines 5 and 8. The subscriber context operator on line 8 gets executed first during the upstream subscription flow. The subscriber context operator on line 5 gets executed next during the upstream subscription flow.

During the downstream data flow, each flatMap operator on lines 3 and 6 will request a subscription context from their respective downstream operators.

Thus, when the flatMap operator on line 3 accesses the subscription context on line 4, the value is "Reactor" because its closest downstream neighbor wrote the value "Reactor" to the subscription context.

But when the flatMap operator on line 6 accesses the subscription context on line 7, the value is "World" because its closest downstream neighbor wrote the value "World" to the subscription context.

The result is therefore "Hello Reactor World" because each flatMap operator concatenated a further different value of the subscription context. This example illustrates that within a program, a same key can have different values depending on where in the program the subscription context is read.

TABLE 6 illustrates how subscription contexts can be nested.

TABLE 6

| | |
|---|---|
| 1 | String key = "message"; |
| 2 | Mono<String> r = |
| 3 | Mono.just("Hello") |
| 4 | .flatMap( s -> Mono.subscriberContext( ) |
| 5 | .map( ctx -> s + " " + ctx.get(key)) |
| 6 | ) |

TABLE 6-continued

```
7       .flatMap( s -> Mono.subscriberContext( )
8           .map( ctx -> s + " " + ctx.get(key))
9           .subscriberContext(ctx -> ctx.put(key, "Reactor"))
10      )
11      .subscriberContext(ctx -> ctx.put(key, "World"));
```

In this example, the subscriber context operator on line 9 is nested within another operator, the flatMap operator on line 7. Therefore, the scope of the subscription context that is written to within another operator does not extend outside of that operator.

Therefore, when the first flatMap operator is executed on line 4, the value it receives for its subscription context is "World", not "Reactor." This is because when the first flatMap operator requests the value of the subscription context from its downstream neighbor, the subscription context operator inside the second flatMap operator does not have a scope that satisfies the request. Therefore, the first flatMap operator actually receives the subscription context set on line 11 in response to its request.

Therefore, the result is "Hello World Reactor" rather than "Hello Reactor World."

One example use case for using subscription contexts is in the context of security. In particular, the subscription context can be used to store a user's credentials, which are propagated upstream to the publisher. The publisher can then access the subscription context to determine whether or not the user has authorization for the data items that the publisher can provide. If so, the publisher can then provide data items to the subscriber using through the downstream data flow. In this instance, the security credentials are not leaked to the method signatures and are instead stored only in the subscription context.

This example illustrates a common pattern for using subscription contexts: user code provides data for the subscription context, and then system library code propagates the data upstream so that upstream operators can tailor their downstream data flow operations according to the data propagated upstream.

This capability allows library developers to more easily perform aspect-oriented programming tasks. In other words, library developers can add additional cross-cutting functionality without the end users having to modify their application code.

Another example relates to database transactions. A program can open a database transaction as part of the subscriber context operator and can store a transaction object in the subscription context. Then, another operator in the chain can inspect the transaction, roll the transaction back, or commit the transaction. And because reactive programming is nonblocking, the threads of the underlying computing system need not wait for database operations to finish before doing other tasks. Therefore, the speed of interacting with the database can be greatly increased, particularly when the database is being used by many concurrent users.

Another useful application of subscription contexts is tracing data flows. In order to trace data flows, the upstream producers need to somehow associate a correlation id with the data items that are being generated. By writing this information to the subscription context, the correlation ids are automatically propagated to the upstream operators, who can use the correlation ids to trace data flows in the system.

The subscription context functionality described above can be implemented by any appropriate reactive programming computing system. In some implementations, the reactive programming functionality, including the capability of supporting subscription contexts, is provided by a library of an existing underlying computing system. For example, the reactive programming functionality can be provided by a library for the Java virtual machine execution environment. Alternatively or in addition, the reactive programming functionality described in this specification can be implemented by a standalone compiler or interpreter for an appropriate reactive programming language.

In some alternative implementations the reactive programming system can implement a mutable subscription context that can be altered during the downstream data flow. As part of this implementation, the updated subscription context can be provided to each downstream operator along with each subsequent data item published in the data flow.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A reactive programming system comprising:
one or more computers and one or more storage devices storing instructions that are operable, when executed by the one or more computers, to cause the one or more computers to perform operations comprising:
receiving a reactive programming program defining an ordering of a plurality of operators, the plurality of operators including a subscriber context operator that writes a value to a subscription context for a particular subscriber, wherein the ordering defines an upstream subscription flow ordering from the particular subscriber to a publisher and a downstream data flow ordering from the publisher to the particular subscriber, and wherein the value written to the subscription context is only available to operators that are upstream from the subscriber context operator, and wherein the plurality of operators include a second subscriber context operator that is upstream from the subscriber context operator, and wherein updating the subscription context for the second subscriber context operator comprises merging a second value written by the second subscriber context with the value written by the subscriber context operator;
evaluating the operators in the upstream subscription flow ordering, including updating a subscription context of each operator with the value written by the subscriber context operator; and
upon receiving an input data item, processing the input data item using the operators in the downstream data flow ordering to generate a final output data item for the input data item, wherein one or more operators that are executed in the downstream data flow ordering access the value of the subscription context written by the subscriber context operator or second subscriber context operator during evaluation of the operations in the upstream subscription flow ordering regardless of which threads executed the respective operators.

2. The system of claim 1, wherein the subscriber context operator occurs in the program after one or more other operators but is executed before any of the other operators.

3. The system of claim 1, wherein evaluating the operators in the upstream subscription flow ordering propagates the subscription context from the particular subscriber to the publisher.

4. The system of claim 1, wherein one or more of the operators are executed by different threads of the reactive programming system.

5. The system of claim 1, wherein accessing, by a particular operator, the value of the subscription context comprises requesting the value of the subscription context from another operator downstream from the particular operator.

6. The system of claim 1, wherein the subscription context is immutable while processing the input data item using the operators in the downstream data flow.

7. The system of claim 1, wherein a second subscriber context operator that is upstream from the subscriber context operator writes a second value that masks the value written by the subscriber context operator by making a copy of the subscription context having the second value.

8. The system of claim 1, wherein a nested value, written by a nested subscriber context operator that is nested inside a first operator of the plurality of operators, is not visible to any upstream operators of the first operator.

9. A computer-implemented method comprising:
receiving, by a reactive programming system comprising one or more computers, a reactive programming program defining an ordering of a plurality of operators, the plurality of operators including a subscriber context operator that writes a value to a subscription context for a particular subscriber, wherein the ordering defines an upstream subscription flow ordering from the particular subscriber to a publisher and a downstream data flow ordering from the publisher to the particular subscriber, and wherein the value written to the subscription context is only available to operators that are upstream from the subscriber context operator, and wherein the plurality of operators include a second subscriber context operator that is upstream from the subscriber context operator, and wherein updating the subscription context for the second subscriber context operator comprises merging a second value written by the second subscriber context with the value written by the subscriber context operator;
evaluating, by the reactive programming system, the operators in the upstream subscription flow ordering, including updating a subscription context of each operator with the value written by the subscriber context operator; and
upon receiving an input data item, processing, by the reactive programming system, the input data item using the operators in the downstream data flow ordering to generate a final output data item for the input data item, wherein one or more operators that are executed in the downstream data flow ordering access the value of the subscription context written by the subscriber context operator during evaluation of the operations in the upstream subscription flow ordering regardless of which threads executed the respective operators.

10. The method of claim 9, wherein the subscriber context operator occurs in the program after one or more other operators but is executed before any of the other operators.

11. The method of claim 9, wherein evaluating the operators in the upstream subscription flow ordering propagates the subscription context from the particular subscriber to the publisher.

12. The method of claim 9, wherein one or more of the operators are executed by different threads of the reactive programming system.

13. The method of claim 9, wherein accessing, by a particular operator, the value of the subscription context comprises requesting the value of the subscription context from another operator downstream from the particular operator.

14. The method of claim 9, wherein the subscription context is immutable while processing the input data item using the operators in the downstream data flow.

15. The method of claim 9, wherein a second subscriber context operator that is upstream from the subscriber context operator writes a second value that masks the value written by the subscriber context operator by making a copy of the subscription context having the second value.

16. The method of claim 9, wherein a nested value, written by a nested subscriber context operator that is nested inside a first operator of the plurality of operators, is not visible to any upstream operators of the first operator.

17. A computer program product, encoded on one or more non-transitory computer storage media, comprising instructions that when executed by one or more computers of a reactive programming system cause the one or more computers to perform operations comprising:

receiving a reactive programming program defining an ordering of a plurality of operators, the plurality of operators including a subscriber context operator that writes a value to a subscription context for a particular subscriber, wherein the ordering defines an upstream subscription flow ordering from the particular subscriber to a publisher and a downstream data flow ordering from the publisher to the particular subscriber, and wherein the value written to the subscription context is only available to operators that are upstream from the subscriber context operator, and wherein the plurality of operators include a second subscriber context operator that is upstream from the subscriber context operator, and wherein updating the subscription context for the second subscriber context operator comprises merging a second value written by the second subscriber context with the value written by the subscriber context operator;

evaluating the operators in the upstream subscription flow ordering, including updating a subscription context of each operator with the value written by the subscriber context operator; and upon receiving an input data item, processing the input data item using the operators in the downstream data flow ordering to generate a final output data item for the input data item, wherein one or more operators that are executed in the downstream data flow ordering access the value of the subscription context written by the subscriber context operator during evaluation of the operations in the upstream subscription flow ordering regardless of which threads executed the respective operators.

\* \* \* \* \*